United States Patent
Argade et al.

(10) Patent No.: US 11,675,591 B2
(45) Date of Patent: Jun. 13, 2023

(54) SELECTIVELY ENABLED RESULT LOOKASIDE BUFFER BASED ON A HIT RATE

(71) Applicant: ADVANCED MICRO DEVICES, INC., Santa Clara, CA (US)

(72) Inventors: Pramod V. Argade, San Diego, CA (US); Daniel Nikolai Peroni, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 72 days.

(21) Appl. No.: 16/176,829

(22) Filed: Oct. 31, 2018

(65) Prior Publication Data

US 2020/0133880 A1   Apr. 30, 2020

(51) Int. Cl.
   *G06F 9/34* (2018.01)
   *G06F 9/38* (2018.01)
   *G06F 1/3287* (2019.01)

(52) U.S. Cl.
   CPC .............. *G06F 9/34* (2013.01); *G06F 1/3287* (2013.01); *G06F 9/3832* (2013.01)

(58) Field of Classification Search
   CPC ......... G06F 1/3287; G06F 9/34; G06F 9/3832
   See application file for complete search history.

(56) References Cited

U.S. PATENT DOCUMENTS

| | | | |
|---|---|---|---|
| 5,260,898 A | 11/1993 | Richardson | |
| 5,649,153 A * | 7/1997 | McNutt | G06F 12/0866 711/112 |
| 5,781,783 A * | 7/1998 | Gunther | G06F 1/3228 700/295 |
| 5,845,103 A * | 12/1998 | Sodani | G06F 9/383 712/216 |
| 5,860,106 A * | 1/1999 | Domen | G11C 11/413 713/324 |
| 6,282,614 B1 * | 8/2001 | Musoll | G06F 12/0897 711/122 |
| 9,047,193 B2 | 6/2015 | Lin et al. | |
| 9,658,851 B2 | 5/2017 | Keramidas et al. | |

(Continued)

FOREIGN PATENT DOCUMENTS

| | | | | |
|---|---|---|---|---|
| DE | 4227113 A1 * | 2/1994 | | B60T 8/885 |
| EP | 2015189 A1 * | 1/2009 | | G06F 12/0862 |

OTHER PUBLICATIONS

Richardson, "Exploiting Trivial and Redundant Computation", IEEE, 1993, pp. 220-227.*

(Continued)

*Primary Examiner* — David J. Huisman

(57) ABSTRACT

A processing system selectively enables and disables a result lookaside buffer (RLB) based on a hit rate tracked by a counter, thereby reducing power consumption for lookups at the result lookaside buffer during periods of low hit rates and improving the overall hit rate for the result lookaside buffer. A controller increments the counter in the event of a hit at the RLB and decrements the counter in the event of a miss at the RLB. If the value of the counter falls below a threshold value, the processing system temporarily disables the RLB for a programmable period of time. After the period of time, the processing system re-enables the RLB and resets the counter to an initial value.

20 Claims, 5 Drawing Sheets

(56) References Cited

U.S. PATENT DOCUMENTS

| | | | |
|---|---|---|---|
| 9,817,466 B2 | 11/2017 | Sideris et al. | |
| 2006/0155964 A1* | 7/2006 | Totsuka | G06F 9/30101 712/214 |
| 2008/0082753 A1* | 4/2008 | Licht | G06F 9/3814 711/128 |
| 2011/0047349 A1* | 2/2011 | Hayashi | G06F 1/3203 712/22 |
| 2014/0229683 A1* | 8/2014 | Hiniker-Roosa | G06F 12/0864 711/144 |

OTHER PUBLICATIONS

Oberman et al., "On Division and Reciprocal Caches", Apr. 1995, 21 pages.*

Sodani et al., "Dynamic Instruction Reuse", Jun. 1997, 12 pages.*

Molina et al., "Dynamic Removal of Redundant Computations", 1999, 8 pages.*

Alvarez et al., "Fuzzy Memoization for Floating-Point Multimedia Applications", Jul. 2005, pp. 922-927.*

Suresh, "Intercepting Functions for Memoization" 2106, 125 pages.*

Neill et al., "Value Prediction", Jun. 30, 2006, 2 pages, Retrieved from <URL: https://web.archive.org/web/20060630002002/http://www.cs.cmu.edu/afs/cs/academic/class/15740-f03/www/lectures/ValuePredictionDisc.htm>.*

"EE 4720 Homework 5 Solution", Louisiana State University, 2000, pp. 1-4, Retrieved from the Internet: <URL: https://www.ece.lsu.edu/ee4720/2000/hw05_sol.pdf>.*

* cited by examiner

SELECTIVELY ENABLED RESULT LOOKASIDE BUFFER BASED ON A HIT RATE

BACKGROUND

Computation units such as arithmetic logic units (ALUs) and floating point units (FPUs) often receive instructions to process the same sets of operands using the same operation codes (referred to as "opcodes") specifying the operation to be performed. Repeatedly reprocessing the same sets of operands using the same opcodes wastes the power, time and resources of the computation units. To save power, a content addressable memory (CAM) such as a cache or buffer stores precomputed results of opcodes in a table. If a lookup to the table reveals that the result of the opcode for a particular set of operands has already been computed (a "hit") and stored at the table, the computation unit uses the precomputed result instead of recalculating the function. However, during periods of a low hit rate, lookups to the CAM can use more energy than would be expended processing the opcodes.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
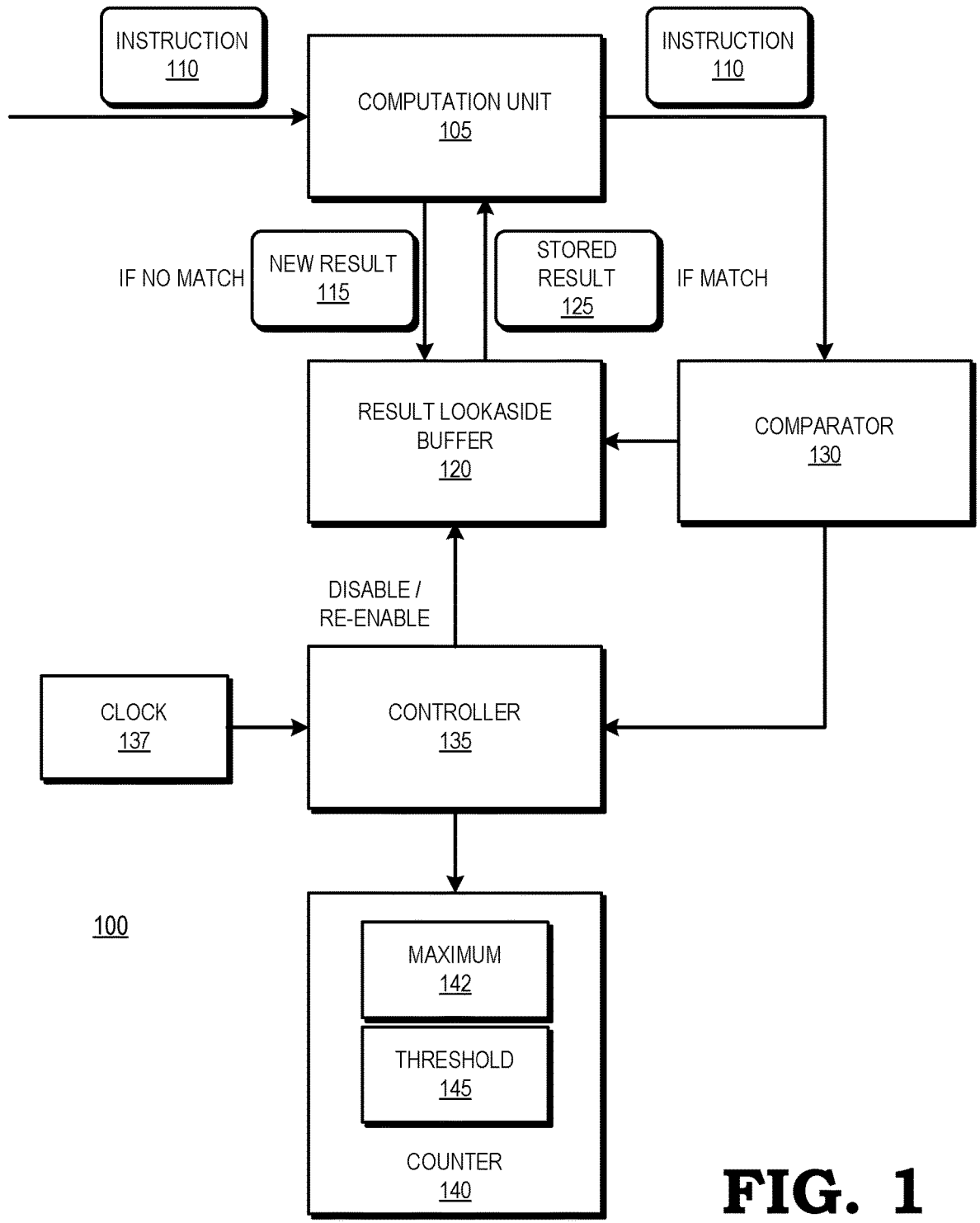
FIG. 1 is a block diagram of a processing system employing a result lookaside buffer that is selectively enabled based on a counter in accordance with some embodiments.

FIGS. 1-5 illustrate techniques for selectively enabling and disabling a result lookaside buffer of a processing system based on a hit rate tracked by a counter, thereby reducing power consumption for lookups at the result lookaside buffer during periods of low hit rates and improving the overall hit rate for the result lookaside buffer. To illustrate, a result lookaside buffer (RLB) is a CAM configured to store opcodes and sets of operands (referred to as instruction information) at a tag portion and corresponding results at a data portion for previously computed opcodes. When a computation unit receives an instruction to perform an operation, based on an opcode, on a set of operands, the processing system compares the instruction information to the tag portion of the RLB. If there is a match, the processing system accesses the result for the instruction from the data portion of the RLB in lieu of performing the operation in an ALU and increments the counter to track that an instance of an RLB hit has occurred. If there is not a match, the computation unit performs the required ALU operation and stores the opcode, operands and result at the RLB while the processing system decrements the counter to track that an RLB "miss" has occurred. If the value of the counter falls below a threshold value, the processing system temporarily disables the RLB for a programmable period of time. In some embodiments, the programmable period of time varies depending on the application executing at the processing system. After the period of time, the processing system re-enables the RLB and resets the counter to an initial value. In some embodiments, the processing system sets a programmable maximum value that the counter cannot exceed. Thus, the processing system increments the counter with each RLB hit until the counter reaches the maximum. If the counter is at the maximum and there is another RLB hit, the counter remains at the maximum (i.e., the counter does not increment past the maximum value). By setting a maximum value for the counter, the counter will fall below the threshold value more quickly if a long period of hits (resulting in many increments of the counter) is followed by a period of misses.

The processing system disables the RLB automatically based on the counter value and re-enables the RLB automatically after the programmable period of time (e.g., a predetermined number of clock cycles), thus conserving power expended on lookups during periods of low hit rates, and utilizing the RLB, thus conserving power expended on the computation unit performing the operation during periods of high hit rates. In some embodiments, the RLB includes fields in addition to opcodes and sets of operands at the tag portion, such as, for example, a valid bit to indicate if the tag portion values are active or inactive, a field to indicate the application programming interface (API) used to process the previously calculated result, and a mode field to indicate the type of shader used to process the previously calculated result, for example on a Graphics Processing Unit (GPU). In addition, the RLB includes a variety of different opcodes including, in some embodiments, special functions such as sine (sin), cosine (cos), square root (sqrt), and reciprocal (rcp). In some embodiments, the values in the tag portion of the RLB are hashed in a smaller number of bits to conserve area and power for RLB lookups. For example, a tag portion of 100 bits is hashed to condense the number of bits to 16 or 24 bits. When comparing an instruction to the tag portion of the RLB, the processing system searches all fields of the tag portion, as is customary for a CAM tag lookup.

If the RLB contains too few entries, the hit rate will be low. However, if the RLB contains too many entries, it will require more area and lookups will be more expensive. In some embodiments, the RLB contains 16 to 64 entries. To improve the efficiency of the RLB, in some embodiments the RLB excludes simple operands such as 0.0 and 1.0, since the ALU may implement a power efficient algorithm to compute results for such common operands. The RLB employs a replacement policy such as a least recently used (LRU) eviction policy for evicting entries to make room for newly computed instructions in the event of a miss. In some embodiments, the processing system pre-loads the RLB by analyzing a set of applications to identify common sets of operands and results and loading the instructions and results into the RLB before execution of the applications begins.

In some embodiments, the RLB stores more complex opcodes commonly called graphics processing unit (GPU) opcodes in place of simple opcodes and common parameters for the functions in place of simple operands in the tag portion and results of the GPU opcodes run with the operands in the data portion. To increase the hit rate, in some embodiments the processing system compares only the X most significant bits of the stored operands (where X is an integer number less than the number of mantissa bits of the stored floating point operands) for floating point operations when comparing an instruction received at the computation unit with the tag portion of the RLB. This amounts to approximate comparison of the floating point operand. In some applications the resulting approximate result may be acceptable. Such approximate comparison may increase the hit rate of the RLB significantly.

FIG. 1 illustrates a processing system 100 employing a result lookaside buffer (RLB) 120 that is selectively enabled based on a counter 140 in accordance with some embodiments. The processing system 100 includes a computation unit 105, the RLB 120, a comparator 130, a controller 135, a clock 137, and the counter 140. The processing system 100 can be incorporated in any of a variety of electronic devices, such as a server, personal computer, tablet, set top box, gaming system, and the like. Some embodiments of the processing system 100 include an input/output (I/O) engine (not shown) for handling input or output operations associated with the display, as well as other elements of the processing system 100 such as keyboards, mice, printers, external disks, and the like.

The computation unit 105 is a processing unit such as an ALU, FPU, shader, or GPU configured to perform calculations and execute instructions. For example, in some embodiments the computation unit 105 computes arithmetic functions, and in some embodiments, the computation unit 105 computes color and other attributes for each fragment, or pixel, of a frame of video or static graphics. The computation unit 105 may be a two-dimensional (2D) shader such as a pixel shader, or a three-dimensional (3D) shader such as a vertex shader, geometry shader, or tessellation shader, or any combination thereof. The computation unit 105 is configured to receive instructions indicating an opcode or other function and one or more operands or other parameters for the function and to perform the operation indicated by the opcode or other function using the operands or other parameters.

The RLB 120 is a content addressable memory (CAM) configured to store at a tag portion opcodes or other functions and one or more operands or other parameters and to store at a data portion previously calculated results of the opcodes or other functions based on the one or more operands or other parameters. In some embodiments, each memory bit of the RLB 120 has its own associated comparison circuit to detect a match between the stored bit and an input search bit, such that the RLB 120 is designed to search its entire memory in a single operation. In some embodiments, the RLB 120 includes at the tag portion additional fields, such as a valid bit to indicate if the tag portion values are active or inactive, an API field, and a mode field to indicate the type of shader used to process the previously calculated result. The purpose of this additional information is to ensure that the result of one shader does not get incorrectly used for another shader if the opcode and the operands happened to be the same. A separate RLB 120 can be implemented for each opcode; however, to save area a single RLB 120 includes a variety of different opcodes including, in some embodiments, special functions such as sine (sin), cosine (cos), square root (sqrt), and reciprocal (rcp). In some embodiments, the values in the tag portion of the RLB 120 are hashed in a smaller number of bits.

The comparator 130 is configured to compare the opcode or other function and operands or other parameters of each instruction received by the computation unit to the tag portion of the RLB 120. The comparator 130 is implemented as, for example, processors executing software, programmable logic, hard-coded logic, or a combination thereof.

To facilitate efficient use of the RLB 120, the controller 135 is configured to increment and decrement the counter 140 and to disable and re-enable the RLB 120 based on the counter such that the RLB 120 is enabled during periods of high hit rates and disabled during periods of low hit rates. To illustrate, in operation, the computation unit 105 receives an instruction 110 to perform an operation indicated by an opcode on a set of one or more operands. The computation unit 105 passes the instruction 110 to the comparator 130 to determine whether the RLB 120 includes an entry matching the instruction 110. The comparator 130 compares the instruction 110 to the tag portion of the RLB 120 to determine if the RLB 120 stores an opcode and set of operands matching the instruction 110. If the instruction 110 matches an entry of the tag portion of the RLB 120, the computation unit 105 retrieves the corresponding stored result 125 for the matching entry from the data portion of the RLB 120 and does not perform the operation indicated by the instruction 110. The comparator 130 signals the controller 135 that an RLB hit has occurred, and the controller 135 determines whether the value of the counter 140 is at a maximum 142. If the value of the counter 140 is not at the maximum 142, the controller 135 increments the counter 140 by a first number N. If the counter 140 is at the maximum 142, the controller does not increment the counter 140 further, but instead leaves the value of the counter 140 at the maximum 142.

If the instruction 110 does not match any entry of the tag portion of the RLB 120, the computation unit 105 performs the operation indicated by the instruction 110 and stores the instruction 110 at the tag portion and the result 115 at the data portion of the RLB 120. The RLB 120 has a limited size, such that it is unable to store an unlimited number of entries. If there is not an entry available in the RLB 120 to store the instruction 110 and the result 115, the RLB 120 implements a replacement policy to select an entry for replacement. The availability of an entry in the RLB 120 is indicated by status information associated with the entry, referred to as the valid status of the entry. In particular, an entry having an invalid status (referred to herein as an invalid entry) is one that is available to store the instruction 110 and the result 115. On the other hand, an entry that is already occupied by other data is therefore not available to store data unless the currently stored data is replaced. To replace a valid entry with the instruction 110 and the result 115, the RLB 120 first evicts the valid entry by deleting it or by transferring it to a separate memory and stores the instruction 110 and the result 115 at the tag portion and data portion of the RLB 120, respectively. In some embodiments, the RLB 120 employs a least recently used (LRU) replacement policy, wherein the RLB 120 selects for eviction the least recently used entry (that is, the entry that was least recently identified as a match for a new instruction received at the computation unit 105).

Further, if the instruction 110 does not match any entry of the tag portion of the RLB 120, the controller 135 decrements the counter 140 by a second number M. The second number M may be the same or different from the first number N used to increment the counter 140 for RLB 120 hits. In some embodiments, the first number N and the second number M are programmable and adjustable based on, e.g., the characteristics of an application executing at the processing system or a desired hit rate of the RLB 120. For example, if the desired hit rate for the RLB 120 is 20%, the controller sets the first number N to 4 and the second number M to 1. Thus, the controller 135 increments the counter by 4 for each RLB hit and decrements the counter by 1 for each RLB miss.

The controller 135 compares the value of the counter 140 to the threshold 145. In some embodiments, the threshold 145 is zero. If the value of the counter 140 drops below the threshold 145, the controller 135 temporarily disables the RLB 120 for a predetermined number of cycles of the clock 137. During the time that the RLB 120 is temporarily disabled, the comparator 130 suspends comparisons between new instructions 110 to the computation unit 105 and the tag portion of the RLB 120. While the RLB 120 is disabled, the computation unit 105 performs operations indicated by the incoming instructions 110 and does not store the results at the RLB 120. After the predetermined number of clock cycles have elapsed, the controller 135 re-enables the RLB 120. The controller 135 sets the value of the counter 140 to an initial value, and the comparator 130 resumes comparing incoming instructions 110 to the tag portion of the RLB 120.

Figure 2:
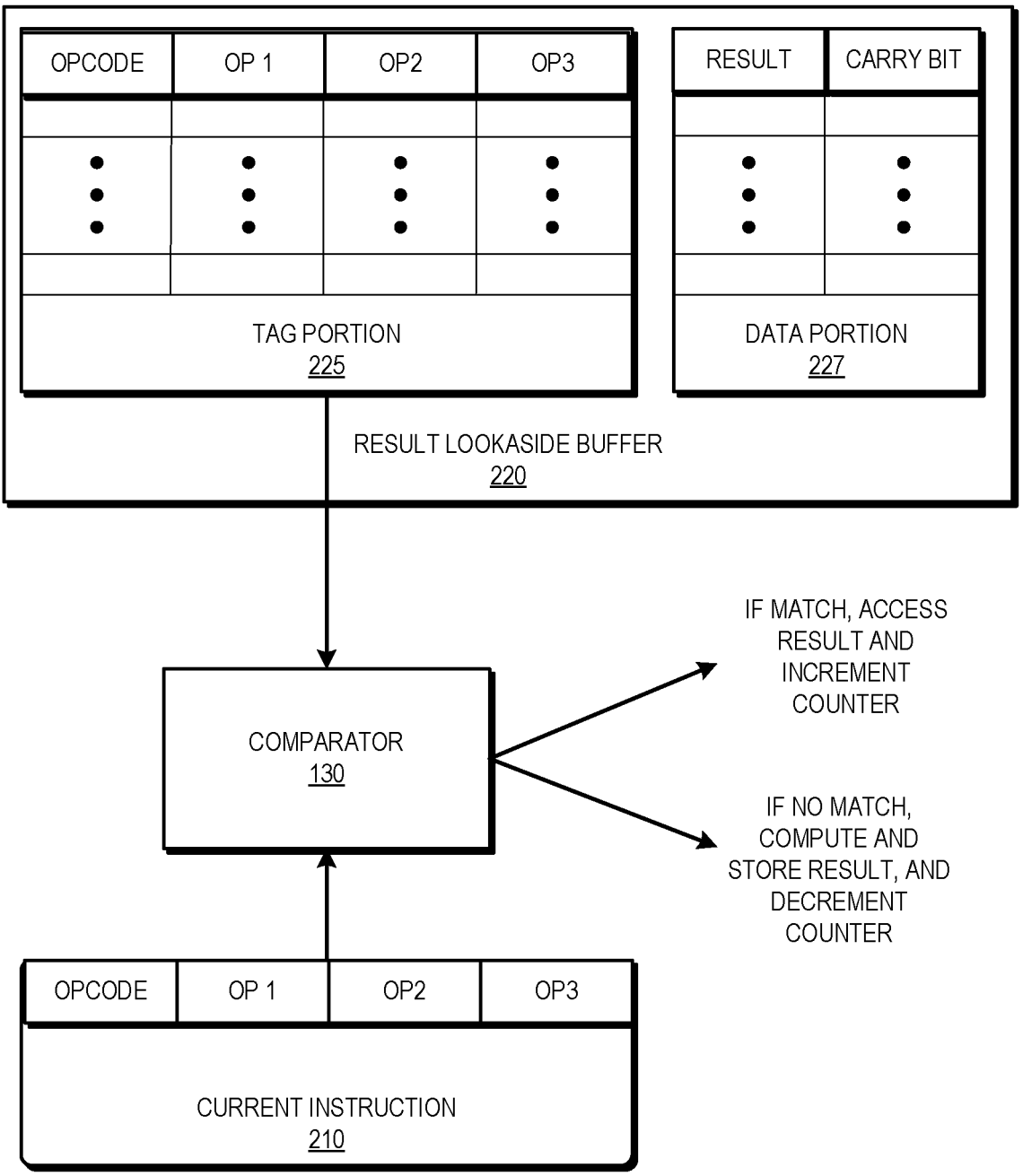
FIG. 2 is a block diagram of the result lookaside buffer of FIG. 1 in accordance with some embodiments.

FIG. 2 is a block diagram of a result lookaside buffer 220 in accordance with some embodiments. The RLB 220 includes a tag portion 225 and a data portion 227. The tag portion 225 includes fields for an opcode and, in the illustrated example a set of up to three operands: OP1, OP2 and OP3. In some embodiments, the RLB 220 includes fields for fewer or more than three operands. In some embodiments, the tag portion 225 includes additional fields, such as a valid bit to indicate if the tag portion values are active or inactive, a field to indicate the API used to process the previously calculated result, such as DX12, and a mode field to indicate the type of shader used to process the previously calculated result. The data portion 227 includes fields for a result and a carry bit. In some embodiments, the data portion may include other side effects for the operation, other than the carry bit. In some embodiments, the RLB 220 excludes entries that include simple operands such as 0.0 and 1.0.

To conserve area and power expended on RLB lookups, the RLB 220 is configured to store a limited number of entries. In some embodiments, the tag portion 225 is hashed to condense the number of bits stored. Additionally, in some embodiments the RLB 220 is pre-loaded with a set of operands and results for an application before execution of the application begins. For example, the processing system 100 of FIG. 1 analyzes one or more applications to identify frequently-used sets of operands and results and stores the operands and results at the RLB 220 before executing the application.

An instruction 210 received at the computation unit 105 (not shown) includes an opcode and a set of operands: OP1, OP2, and OP3. The comparator 130 compares the instruction 210 to the tag portion 225 of the RLB 220. If the instruction 210 matches an entry of the tag portion 225, the computation unit 105 (not shown) accesses the corresponding result and carry bit at the data portion 227 and the controller (not shown) increments the counter (not shown) by an amount N unless the counter is at the maximum. If the instruction 210 does not match any entry of the tag portion 225, the computation unit performs the operation indicated by the instruction 210 and stores instruction 210 and related information (for additional fields, if any) at the tag portion 225 and the result at the data portion 227 of the RLB 220. The controller decrements the counter by an amount M and determines whether the counter is below the threshold.

Figure 3:
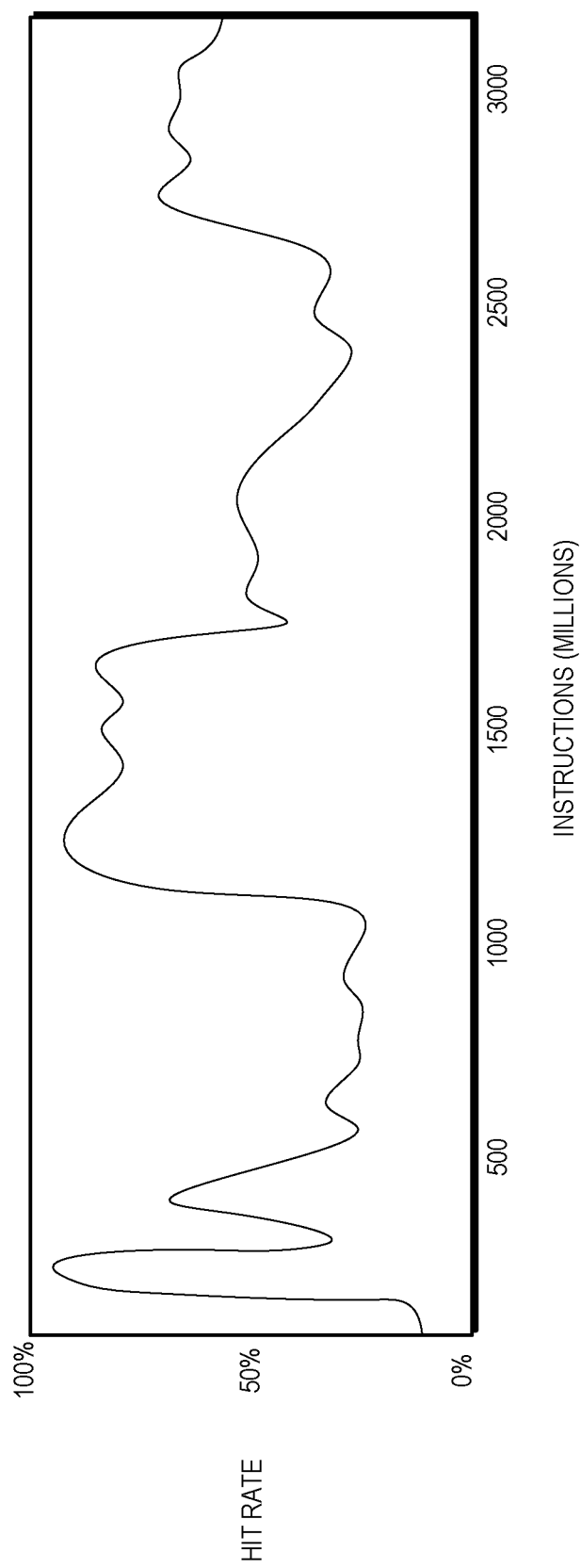
FIG. 3 is a diagram illustrating a hit rate over time for a result lookaside buffer in accordance with some embodiments.

FIG. 3 is a diagram illustrating a hit rate over time for a result lookaside buffer in accordance with some embodiments. The horizontal axis indicates a number of instructions (in millions), and the vertical axis indicates an RLB hit rate for an application. The hit rate fluctuates from close to 0% to almost 100%, with some relatively steady periods of either a low or high hit rate. By disabling the RLB 120 of FIG. 1 during periods of low hit rates, the processing system 100 conserves power that would be expended on RLB lookups that have a low probability of resulting in a hit. In addition, by setting a maximum value 142 for the counter 140, the controller 135 does not allow the value of the counter 140 to climb excessively high during a period of a high hit rate, such as that shown in FIG. 3 from approximately 1200 (million) instructions to approximately 1700 (million) instructions. If the value of the counter 140 were to continue to increment during such a high hit rate period, a subsequent period having a low hit rate would not result in the counter falling below the threshold 145 for an excessive amount of time during which the processing system 100 could conserve power by disabling the RLB 120. By setting the maximum value 142 for the counter 140, the controller 135 is able to more quickly react to a period of a low hit rate (i.e., the counter value will more quickly fall below the threshold 145) and disable the RLB 120.

Figure 4:
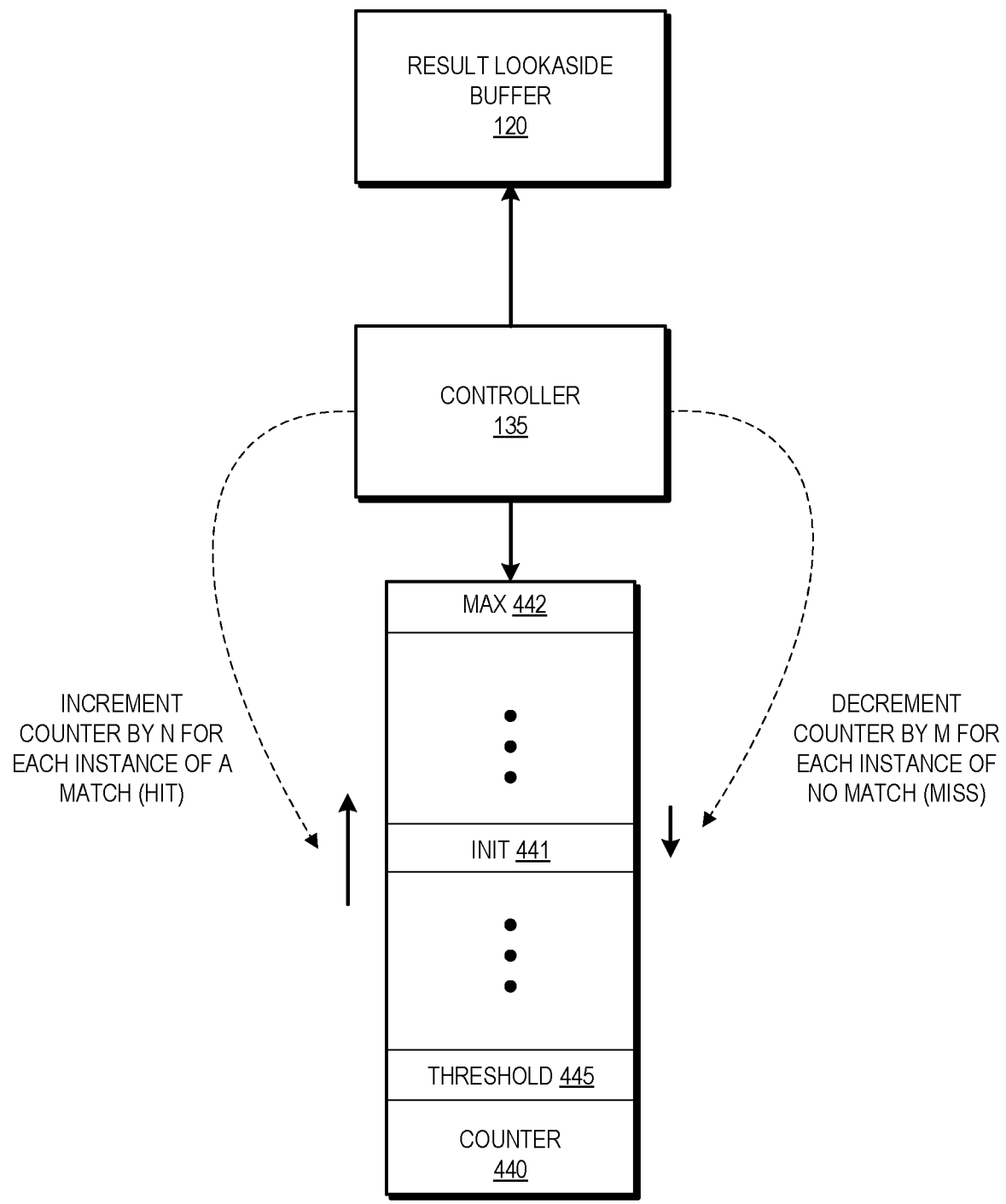
FIG. 4 is a block diagram of the counter of FIG. 1 in accordance with some embodiments.

FIG. 4 is a block diagram of an example 440 of the counter 140 of FIG. 1 in accordance with some embodiments. The counter 440 is programmed to have a maximum value 442 and a threshold 445. In response to an RLB hit, the controller 135 determines whether the counter 440 is at the maximum value 442. If the counter 440 is at the maximum value 442, the controller leaves the counter 440 at the maximum value. If the counter 440 is not at the maximum value 442, the controller 135 increments the counter 440 by a programmable number N, saturating it to maximum value 442 if necessary. In response to an RLB miss, the controller 135 decrements the counter 440 by a programmable number M. In some embodiments, the programmable number N for incrementing the counter is greater than the programmable number M. The controller 135 then determines whether the value of the counter 440 is below the threshold 445. If the value of the counter 440 is below the threshold 445, the controller 135 temporarily disables the RLB 120 for a programmable predetermined period of time (i.e., a predetermined number of clock cycles). In some embodiments, the predetermined period of time is programmed based on characteristics of an application executing at the processing system.

During the time that the RLB 120 is disabled, the comparator (not shown) suspends comparing new instructions received at the computation unit (not shown) to the tag portion of the RLB 120, and the computation unit performs operations indicated by the instructions without regard to the RLB 120. After the predetermined period of time has elapsed, the controller sets the counter 440 to an initial value 441 and re-enables the RLB 120. In some embodiments, the initial value 441 is programmed based on characteristics of an application executing at the processing system.

Figure 5:
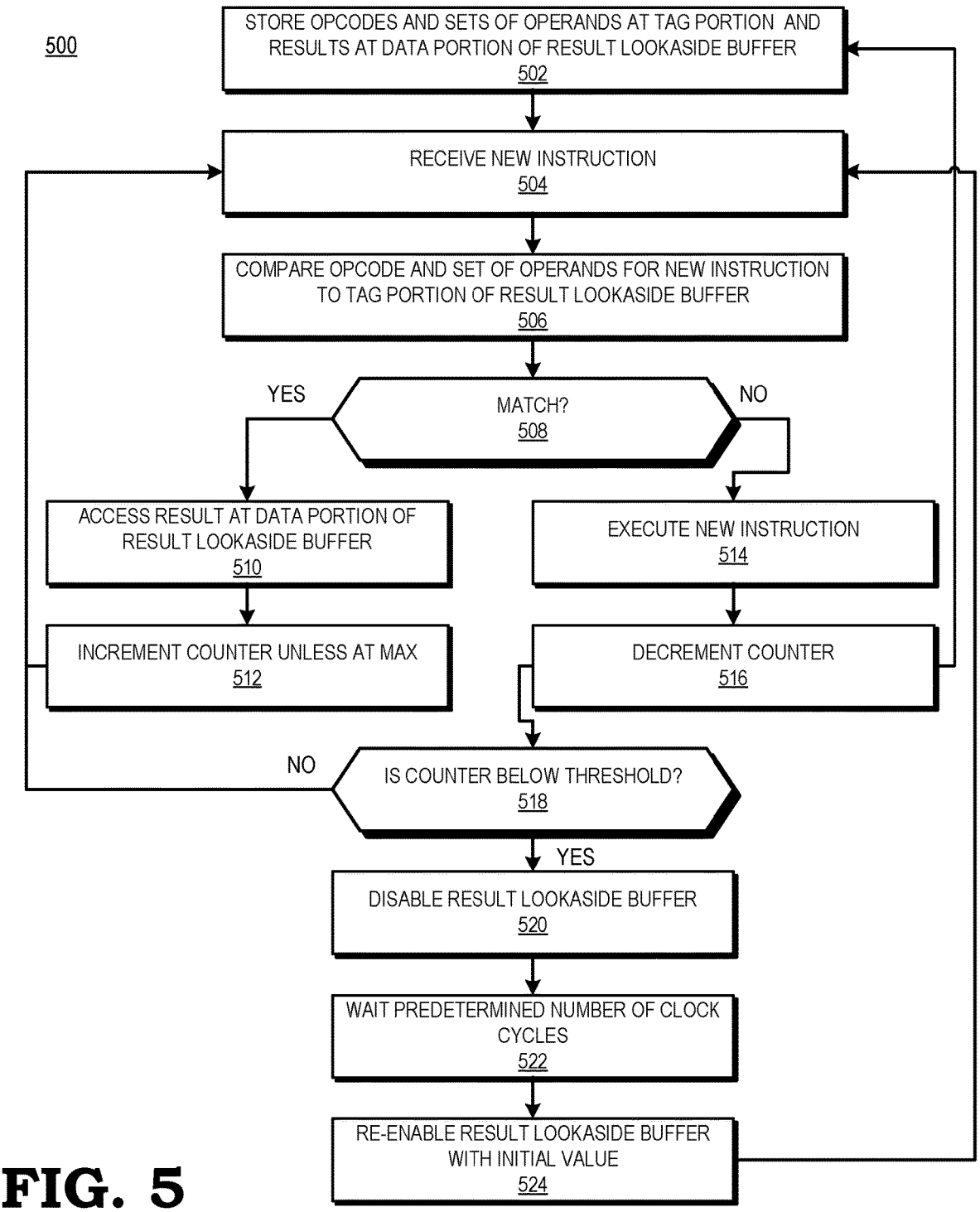
FIG. 5 is a flow diagram illustrating a method for selectively enabling and disabling a result lookaside buffer based on a counter in accordance with some embodiments.

FIG. 5 is a flow diagram illustrating a method 500 for selectively enabling and disabling a result lookaside buffer based on a counter in accordance with some embodiments. The method 500 is implemented in some embodiments of the processing system 100 shown in FIG. 1 and the RLB 220 shown in FIG. 2.

At block 502, the RLB 220, if enabled, stores opcodes and sets of operands at the tag portion 225 and results and a carry bit at the data portion 227. In some embodiments, the processing system 100 analyzes one or more applications to identify commonly-used opcodes and sets of operands and pre-loads the RLB 220 with the identified opcodes, sets of operands, and results. At block 504, the computation unit 105 receives a new instruction 110 to perform an operation indicated by an opcode on a set of one or more operands. At block 506, the comparator 130 compares the opcode and set of operands of the instruction 110 to the tag portion 225 of the RLB 220. At block 508, the comparator 130 determines whether the instruction 110 matches an entry of the tag portion 225 of the RLB 220. If there is a match, at block 510, the computation unit 105 accesses the result corresponding to the matching tag portion entry from the data portion 227 of the RLB 220 instead of performing the operation indicated by the instruction 110. At block 512, the controller 135 increments the counter 140 by a programmable number N unless the counter 140 is at a maximum value 142. If the counter 140 is at a maximum value 142, the controller 135 leaves the counter 140 at the maximum value 142. The method flow then continues back to block 504, at which the computation unit 105 receives a new instruction 110.

If, at block 508, the comparator 130 determines that there is not a match between the instruction 110 and the entries of the tag portion 225 of the RLB 220, at block 514 the computation unit 105 executes the instruction 110 (i.e., the computation unit 105 performs the operation indicated by the opcode on the set of one or more operands) and stores the information indicated by the instruction 110 (e.g., the opcode, set of operands, and, in some embodiments, additional fields such as a valid bit, API, and mode) at the tag portion 225 of the RLB 220 and stores the result and a carry bit at the data portion 227 of the RLB 220. If there are no available entries at the RLB 220, the RLB 220 applies a replacement policy such as LRU to evict an entry and replace the evicted entry with the information indicated by the instruction 110 at the tag portion 225 and the result and carry bit at the data portion 227 of the RLB 220.

At block 516, the controller 135 decrements the counter 140 by a programmable number M. At block 518, the controller 135 determines whether the value of the counter 140 is less than a threshold value 145 such as 1 (i.e., whether the counter 140 is at zero). If the counter 140 is not less than the threshold value 145, the method flow continues back to block 504, at which the computation unit receives a new instruction 110. If, at block 518, the controller 135 determines that the counter 140 is below the threshold 145, the controller 135 temporarily disables the RLB 220 at block 520. At block 522, the controller 135 waits a programmable predetermined number of clock cycles. During the time that the RLB 220 is disabled, the comparator 130 suspends comparing new instructions 110 received at the computation unit 105 to the tag portion 225 of the RLB 220, and the computation unit 105 performs operations indicated by the instructions 110 without regard to the RLB 220. At block 524, after the predetermined number of clock cycles has elapsed, the controller 135 re-enables the RLB 220 and sets the value of the counter 140 to a programmable initial value, after which the method flow continues back to block 504, at which the computation unit 105 receives a new instruction 110.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:
1. A method comprising:
   tracking hits and misses for a result lookaside buffer in response to an effective number of hits being below a maximum value, wherein an effective number of hits is a number of hits times a first number N; and disabling the result lookaside buffer in response to the effective number of hits minus an effective number of misses dropping below a threshold value, wherein the effective number of misses is a number of misses times a second number M, wherein M is less than N.

2. The method of claim 1, further comprising:
while the result lookaside buffer is disabled, suspending comparisons between incoming instructions to a computation unit and a tag portion of the result lookaside buffer.

3. The method of claim 2, further comprising:
while the result lookaside buffer is disabled, performing operations indicated by the incoming instructions and not storing results of the incoming instructions at the result lookaside buffer.

4. The method of claim 1, wherein the first number N and the second number M are programmable and adjustable based on a desired hit rate of the result lookaside buffer.

5. The method of claim 1, further comprising:
re-enabling the result lookaside buffer a first number of clock cycles after disabling the result lookaside buffer; and
setting the effective number of hits minus the effective number of misses to an initial value.

6. The method of claim 1, further comprising:
never including a first set of operands in the result lookaside buffer.

7. The method of claim 1, wherein a hit comprises the X most significant bits of a first set of operands stored at the result lookaside buffer matching the X most significant bits of a second set of operands of an instruction received for execution at a computation unit, wherein X is an integer number less than the number of bits comprising the first set of operands and the second set of operands.

8. A method, comprising:
tracking hits and misses of a result lookaside buffer in response to an effective number of hits being below a maximum value, wherein an effective number of hits is a number of hits times a first number N;
disabling the result lookaside buffer in response to the effective number of hits minus an effective number of misses dropping below a threshold value, wherein the effective number of misses is a number of misses times a second number M, wherein M is less than N; and
re-enabling the result lookaside buffer a first number of clock cycles after disabling the result lookaside buffer and resetting the effective number of hits minus the effective number of misses to an initial value.

9. The method of claim 8, further comprising suspending comparisons between incoming instructions to a computation unit and a tag portion of the result lookaside buffer while the result lookaside buffer is disabled.

10. The method of claim 9, further comprising performing operations indicated by the incoming instructions and not storing results of the incoming instructions at the result lookaside buffer while the result lookaside buffer is disabled.

11. The method of claim 8, wherein the first number N and the second number M are programmable and adjustable based on a desired hit rate of the result lookaside buffer.

12. The method of claim 8, wherein the result lookaside buffer never stores a first set of operands.

13. The method of claim 8, wherein a hit comprises the X most significant bits of a first set of operands stored at the result lookaside buffer matching the X most significant bits of a second set of operands of an instruction received for execution at a computation unit, wherein X is an integer number less than the number of bits comprising the first set of operands and the second set of operands.

14. A device, comprising:
processing circuitry to execute a plurality of instructions, each instruction of the plurality of instructions comprising an opcode and a set of operands, the set comprising at least one operand;
a result lookaside buffer comprising a tag portion and a data portion;
a comparator to compare instructions of the plurality of instructions to the tag portion of the result lookaside buffer to determine hits and misses at the result lookaside buffer; and
controller circuitry to:
track hits and misses for a result lookaside buffer in response to an effective number of hits being below a maximum value, wherein an effective number of hits is a number of hits times a first number N; and
disable the result lookaside buffer in response to the effective number of hits minus an effective number of misses dropping below a threshold value, wherein the effective number of misses is a number of misses times a second number M, wherein M is less than N.

15. The device of claim 14, wherein the comparator is to:
suspend comparisons between incoming instructions to a computation unit and the tag portion of the result lookaside buffer while the result lookaside buffer is disabled.

16. The device of claim 15, wherein the processing circuitry is to perform operations indicated by the incoming instructions and not store results of the incoming instructions at the result lookaside buffer while the result lookaside buffer is disabled.

17. The device of claim 16, wherein the first number N and the second number M are programmable and adjustable based on a desired hit rate of the result lookaside buffer.

18. The device of claim 16, wherein the controller circuitry is to re-enable the result lookaside buffer a first number of clock cycles after disabling the result lookaside buffer and set the effective number of hits minus the effective number of misses to an initial value in response to re-enabling the result lookaside buffer.

19. The device of claim 14, wherein the comparator is to compare the X most significant bits of each set of operands of the plurality of instructions and at least one set of operands stored at the tag portion of the result lookaside buffer, wherein X is an integer number less than the number of bits comprising each set of operands of the plurality of instructions and the at least one set of operands stored at the tag portion of the result lookaside buffer.

20. The device of claim 14, wherein the result lookaside buffer is configured to never include a first set of operands.

* * * * *